United States Patent
Denning et al.

(10) Patent No.: US 7,589,499 B2
(45) Date of Patent: Sep. 15, 2009

(54) OVER VOLTAGE TRANSIENT CONTROLLER

(75) Inventors: Bruce S. Denning, Monterey, CA (US);
Guoxing Li, Sunnyvale, CA (US);
Liusheng Liu, San Jose, CA (US)

(73) Assignee: O2Micro International Limited, Grand Cayman (KY)

( * ) Notice: Subject to any disclaimer, the term of this patent is extended or adjusted under 35 U.S.C. 154(b) by 419 days.

(21) Appl. No.: 10/832,620

(22) Filed: Apr. 27, 2004

(65) Prior Publication Data

US 2005/0212489 A1 Sep. 29, 2005

Related U.S. Application Data

(60) Provisional application No. 60/556,254, filed on Mar. 25, 2004.

(51) Int. Cl.
*H02J 7/00* (2006.01)
*H02J 7/04* (2006.01)

(52) U.S. Cl. ..................... 320/134; 320/140

(58) Field of Classification Search ............... 320/140, 320/134
See application file for complete search history.

(56) References Cited

U.S. PATENT DOCUMENTS

| 5,539,299 | A | | 7/1996 | Fernandez et al. |
|---|---|---|---|---|
| 5,789,902 | A | | 8/1998 | Abe et al. |
| 6,111,388 | A | * | 8/2000 | Mukainakano ............ 320/134 |
| 6,208,117 | B1 | * | 3/2001 | Hibi ........................ 320/134 |
| 6,369,576 | B1 | * | 4/2002 | Matthews et al. .......... 324/426 |
| 6,888,355 | B2 | | 5/2005 | Kitazawa et al. |
| 2003/0132732 | A1 | | 7/2003 | Thomas et al. |
| 2003/0169020 | A1 | * | 9/2003 | Malcolm .................... 320/136 |

FOREIGN PATENT DOCUMENTS

| GB | 2292845 | 3/1996 |
|---|---|---|
| JP | 08079982 | 3/1996 |
| JP | 09289738 | 4/1997 |

(Continued)

OTHER PUBLICATIONS

English translation of related Chinese Office Action dated Mar. 9, 2007, 5 pages.

(Continued)

*Primary Examiner*—Edward Tso
*Assistant Examiner*—Alexis Boateng
(74) *Attorney, Agent, or Firm*—Grossman, Tucker, Perreault & Pfleger, PLLC

(57) ABSTRACT

An over voltage transient controller to protect a rechargeable battery from an over voltage transient condition. The over voltage transient controller may comprise a comparator to compare a first signal with a second signal representative of a reference voltage level and to provide an output signal representative of an over voltage transient condition to a switch if the first signal is greater than or equal to the second signal. The switch is responsive to the output signal to protect the rechargeable battery from the over voltage transient condition. The over voltage transient controller may further comprise a DAC, wherein the second signal is based, at least in part, on an output of the DAC. An apparatus comprising a charge switch and such an over voltage transient controller is also provided.

10 Claims, 13 Drawing Sheets

FOREIGN PATENT DOCUMENTS

| | | |
|---|---|---|
| JP | 09130988 | 5/1997 |
| JP | 11178222 | 7/1999 |
| JP | 2000069689 | 3/2000 |

OTHER PUBLICATIONS

Japanese Office Action dated Nov. 25, 2008 issued in related Japanese Patent Application No. 2005090074.

English translation of Preliminary Notice of Rejection issued May 26, 2006 received in corresponding Taiwan Patent Application (2 pages).

International Search Report with Written Opinion dated Jan. 22. 2007 received in corresponding International Patent Application No. PCT/US05/09803 (10 pages).

* cited by examiner

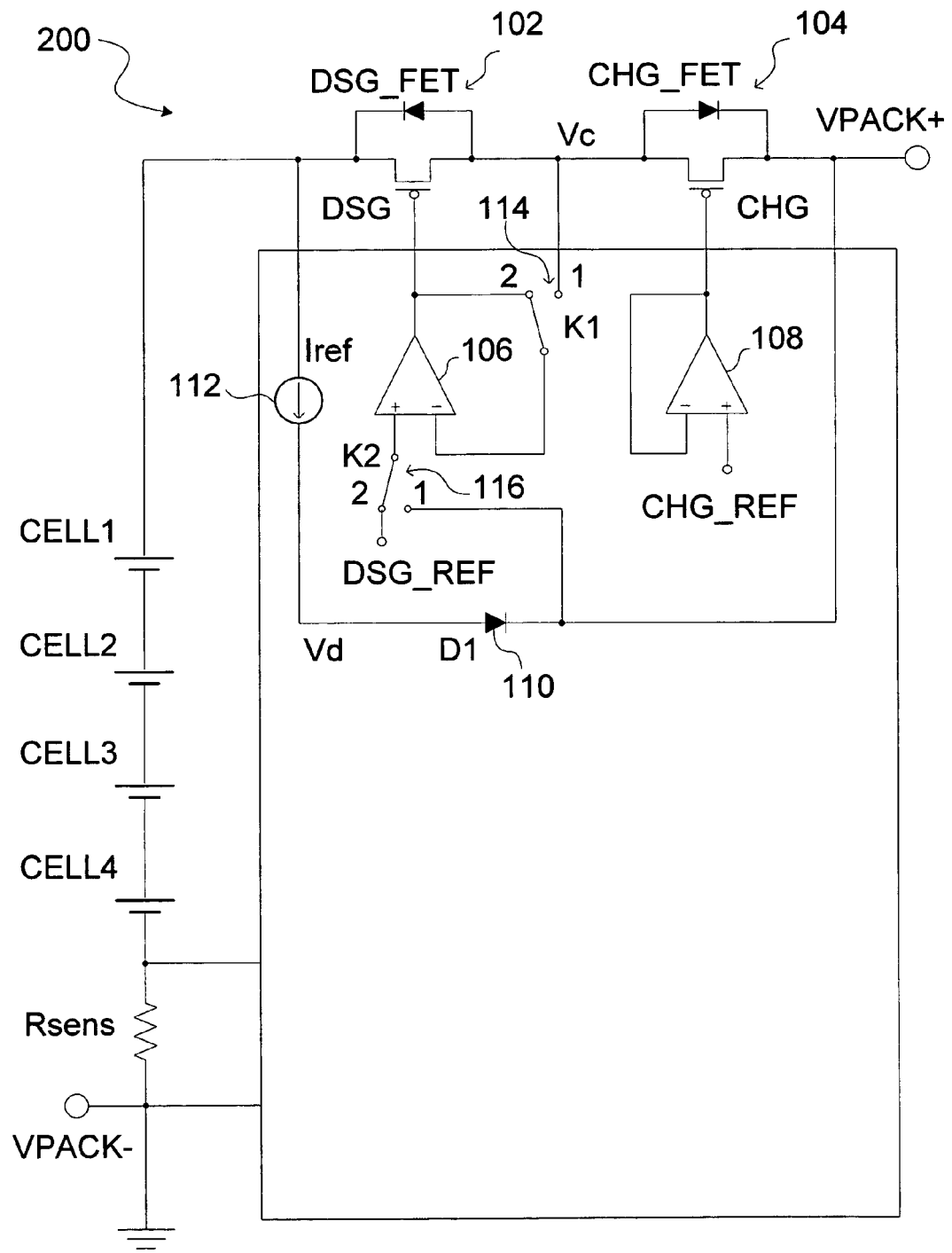
FIG. 2B MODIFIED FOR TRICKLE DISCHARGE

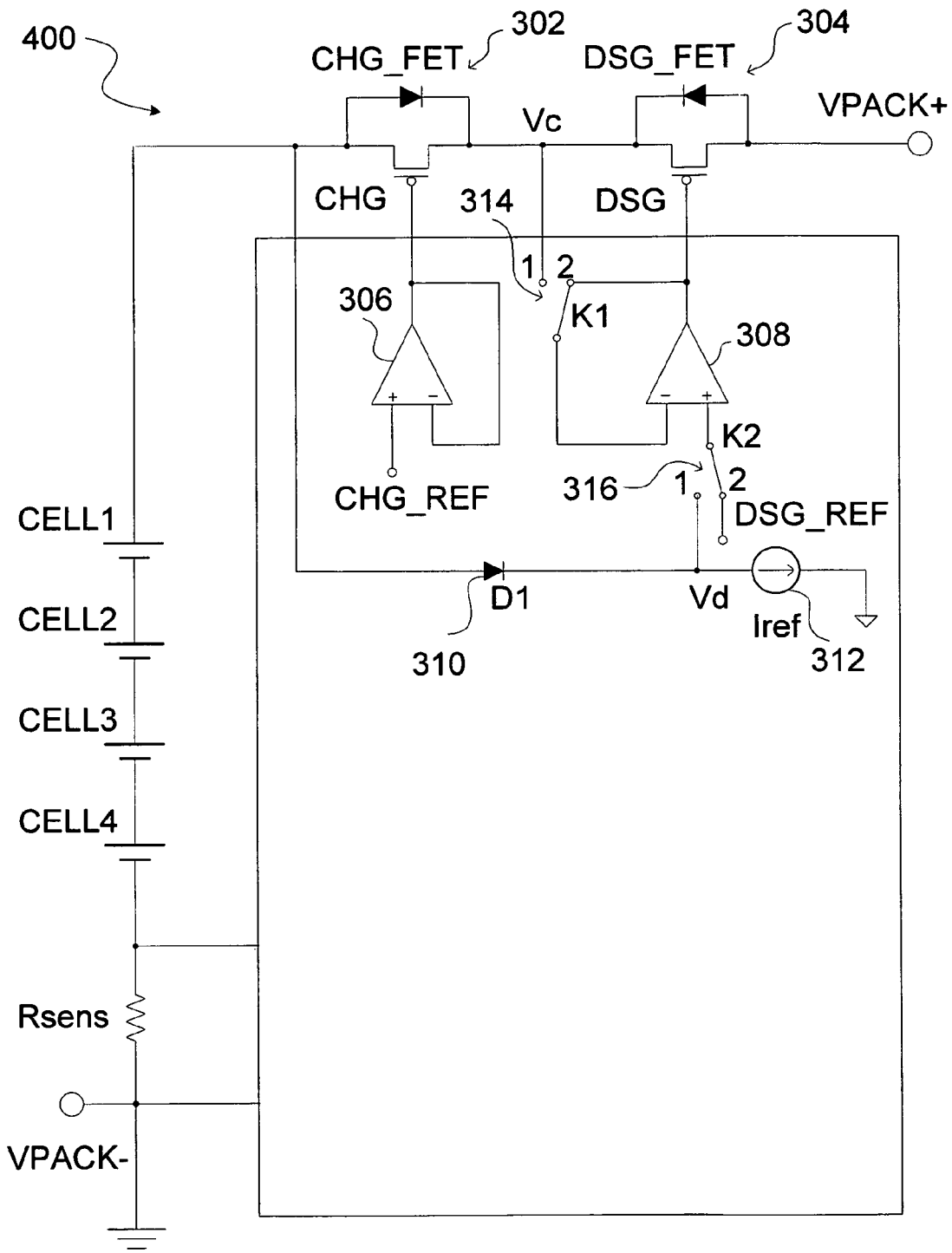
FIG. 3B MODIFIED FOR TRICKLE DISCHARGE

FIG. 5 N BITS PROGRAMMABLE REFERENCE CURRENT SOURCE

OVER VOLTAGE TRANSIENT CONTROLLER

CROSS REFERENCE TO RELATED APPLICATIONS

The present claims the benefit of U.S. Provisional Application Ser. No. 60/556,254 filed Mar. 25, 2004, the teachings of which are also incorporated herein by reference.

FIELD OF THE INVENTION

The present disclosure relates to an over voltage transient controller. Utility for the present invention can be found in battery charging and/or systems for portable electronic devices, for example, laptop computers, PDAs, cell phones, and/or any type of electronic device having a rechargeable battery.

BACKGROUND OF THE INVENTION

Rechargeable batteries, especially lithium ion batteries, need to precharge (recovery-charge) from deeply discharged status to avoid stressing the depleted batteries. When a rechargeable battery is deeply discharged and its cell voltage lower than an under voltage threshold $V_{UV}$, it cannot be directly charged using large charging current. Instead, a precharge mode is needed. In pre-charged mode, a small charging current is used, until the battery voltage is charged larger than the voltage $V_{UV}$, then it can be charged in normal mode, i.e. charging by larger charging current. So, pre-charging mode also called trickle charge or wake-up charge. For lithium ion battery, the threshold voltage $V_{UV}$ is approximately 2.4V~3.0V for one cell, depending on battery type and manufacturer. The pre-charging current is about 10 mA~100 mA. However, the normal charge current can be a few hundred milli-Amperes to 1 Ampere depending on the battery capacity.

FIG. 1A depicts the charging profile 50 for a lithium ion rechargeable battery. When the battery voltage is higher than $V_{UV}$, the battery enters into constant current (CC) charging mode, and a large constant current is used to charge the battery (the battery voltage also increases as the battery capacity increases). When the battery voltage increases to $V_{OV}$, which represents overvoltage threshold (normally around 4.2V for a LiIon battery), the battery enters into constant voltage (CV) charging mode. In this mode, the charger holds the voltage at $V_{OV}$. When the charging current decreases to a predetermined minimum value, for example 50 mA, the charge procedure is stopped. During the CV charge mode, the charger must regulate the voltage precisely to $V_{OV}$ (to within +/−0.005 V), otherwise the charging current will not taper off with increasing battery capacity. If, for example, the charging output is larger than $V_{OV}$ then over-charging the battery may occur, which may present safety issues with LiIon batteries.

The conventional circuit 10 to implement precharging is shown in FIG. 1B. A precharge MOSFET 12 in series with a resistor 14 are used for precharging. At the time of precharging, charging FET 16 turns off and precharging FET 12 turns on. Therefore, the precharging current is approximately determined by the voltage difference between charger input voltage VPACK+ and total cell voltage Vcell, VPACK+−Vcell, divided by the serial resistor 14 Rpre. When the AC adapter is present and VPACK+ is higher than the cell voltage Vcell, the charging or precharging will start based on the initial voltage of each cell. If the voltage in any cell is lower than the threshold $V_{UV}$, the battery pack will be in the precharging mode. Otherwise normal charging will be taken.

Those skilled in the art will recognize that the circuit 10 of FIG. 1B includes a battery monitor IC 20 that includes circuitry to monitor voltage and current conditions on each of the cells (Cell1, Cell2 . . . Cell4) of the battery pack 22. Such circuitry may include a switching network 24 to sample each cell voltage. To control the operation of the precharge MOSFET 12, the conventional circuit 10 includes a comparator 26 that compares a constant reference voltage 28 ($V_{UV}$) with the voltage across each cell, via switches 30.

However, one drawback of the topology depicted in FIG. 1B is that an extra power MOSFET (i.e., MOSFET 12) and resistor 14 are required, which are expensive and increase PCB area. Additionally, with this topology, the lower the cell voltage results in a larger precharging current. Also, precharging current decreases with the increasing of cell voltage, which translates into longer time to finish precharging.

Additional, since the value of the resistor 14 is fixed, the maximum and minimum precharge current is also fixed, and cannot be adjusted to accommodate different battery pack requirements.

BRIEF DESCRIPTION OF THE DRAWINGS

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

FIG. 2B is one exemplary trickle discharge topology according to the present invention;

FIG. 3B is another exemplary trickle discharge topology according to the present invention;

DETAILED DESCRIPTION

Figure 2A:
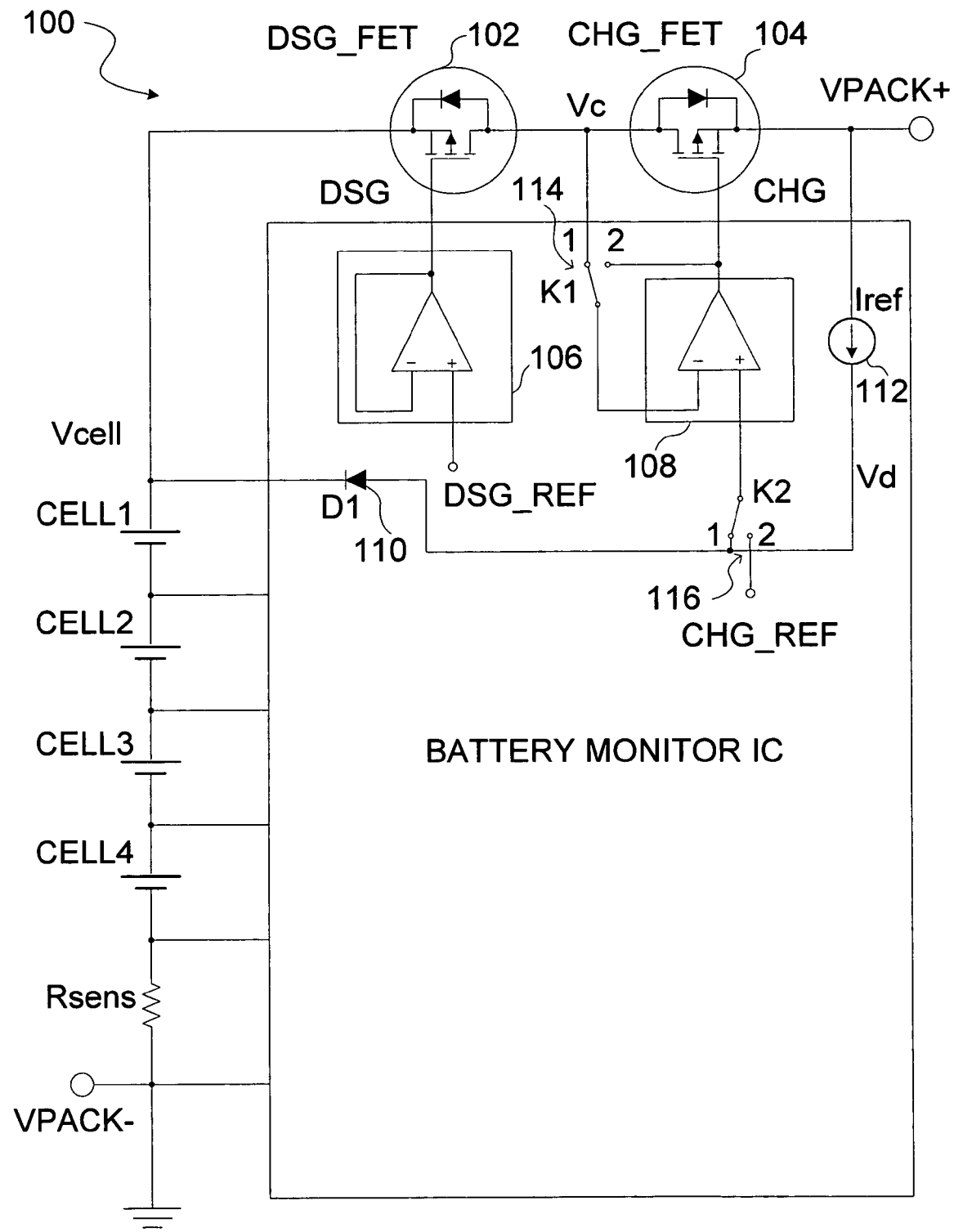
FIG. 2A is one exemplary trickle charge topology according to the present invention.

FIG. 2A depicts one exemplary trickle charge topology 100 according to the present invention. In this embodiment, two FETs (charge FET CHG_FET and discharge FET DSG_FET) may be used. In this embodiment, the charge FET 104 and discharge FET 102 may be placed back-to-back in series in the manner depicted and as understood in the art. In a trickle charge mode, the discharge FET 102 may be off (non-conducting), but current may still pass through its body diode to the battery cells if charge FET(CHGFET) is on (conducting). If CHG_ET is off, then no current flows from or into the battery cells.

Besides two MOSFETs, this topology 100 may also include a reference diode D1 110, discharge driver 106, charger driver 108, and reference current source Iref 112. The charge driver 108 and discharge driver 106 may each comprise respective amplifiers. In a regular charge mode, switches K1 and K2 (114 and 116) are set to position 2. In this position, the charge driving voltage CHG is driven to a point approximately equal to a relative reference voltage CHG-REF, which operates to fully turn on the charge FET 104. Therefore, the reference voltage CHG-REF is selected in accordance with the turn on requirements of the charge FET device 104.

In a trickle charge mode, switches K1 and K2 may be set to position 1. When an AC adapter is applied, VPACK+ voltage may rise. The charge FET 104 may be driven into saturation by the charge driver 108, which may mean that the charge FET 104 acts as a variable resistance, and a trickle charge may flow through the switch 104. The charge driver 108 may be adapted to regulate the charge FET (CHG_FET) 104 to force the voltage Vc equal to Vd, which may be set by diode D1 110 and reference current source Iref 112.

Vc is derived as the voltage between the switches. Vc may be set as the input to the (−) terminal of the amplifier, while Vd (set by Iref and D1) may be set as the input to the (+) terminal. The output signal CHG is Vd−Vc. While Vc may be approximately equal to Vd, the gain of the amplifier may be selected such that a large output signal is produced sufficient to cause the charge FET to operate in saturation region. Thus, the charger driver 108 may be adapted to operate during the trickle charge period to compare a fixed signal (Vd) with Vc.

In forward bias condition, the diode D1 DC current is given by:

$$Iref=A1*IS1*(\exp(Vd1/Vt)-1)$$

where A1 is diode D1 junction area, IS1 is diode D1 unit reverse saturation current, Vd1=Vd−Vcell is the voltage drop across the diode D1, and Vt is diode threshold voltage.

The DC current in the body diode of discharge FET 102 is given by:

$$Ipch=A2*IS2*(\exp(Vd2/Vt)-1)$$

where A2 is the body diode junction area, IS2 is the body diode unit reverse saturation current Vd2=Vc−Vcell is the voltage drop across discharge FET body diode.

IS1 and IS2 are determined by the type of semiconductor device chosen, as is well understood in the art.

If Vd and Vc are forced to be substantially equal, then the trickle charge current is proportional to the reference current Iref, and is given by:

$$Ipch=A2/A1*(IS2/IS1)*Iref.$$

Preferably, although not required by the present invention, the junction area A2 of the body diode of the charge and discharge FETs is typically large because of low turn-on resistance and high current requirement, while the junction area A1 of diode D1 is very small in order to save die area. Therefore, a small current Iref (tens of micro-amper) can be used to control larger current Ipch (tens to hundreds of milli-amper), since A2>>A1.

FIG. 2B depicts one exemplary trickle discharge topology 200 according to the present invention. This embodiment is similar to the topology 100 depicted in FIG. 2A, except the reference current source 112 and the diode 110 are coupled on the discharge MOSFET 102. During a trickle discharge period the charge MOSFET 104 may be OFF, and discharge current flows through its body diode. The operation of the topology 200 is otherwise described above with reference to FIG. 2A.

Figure 3A:
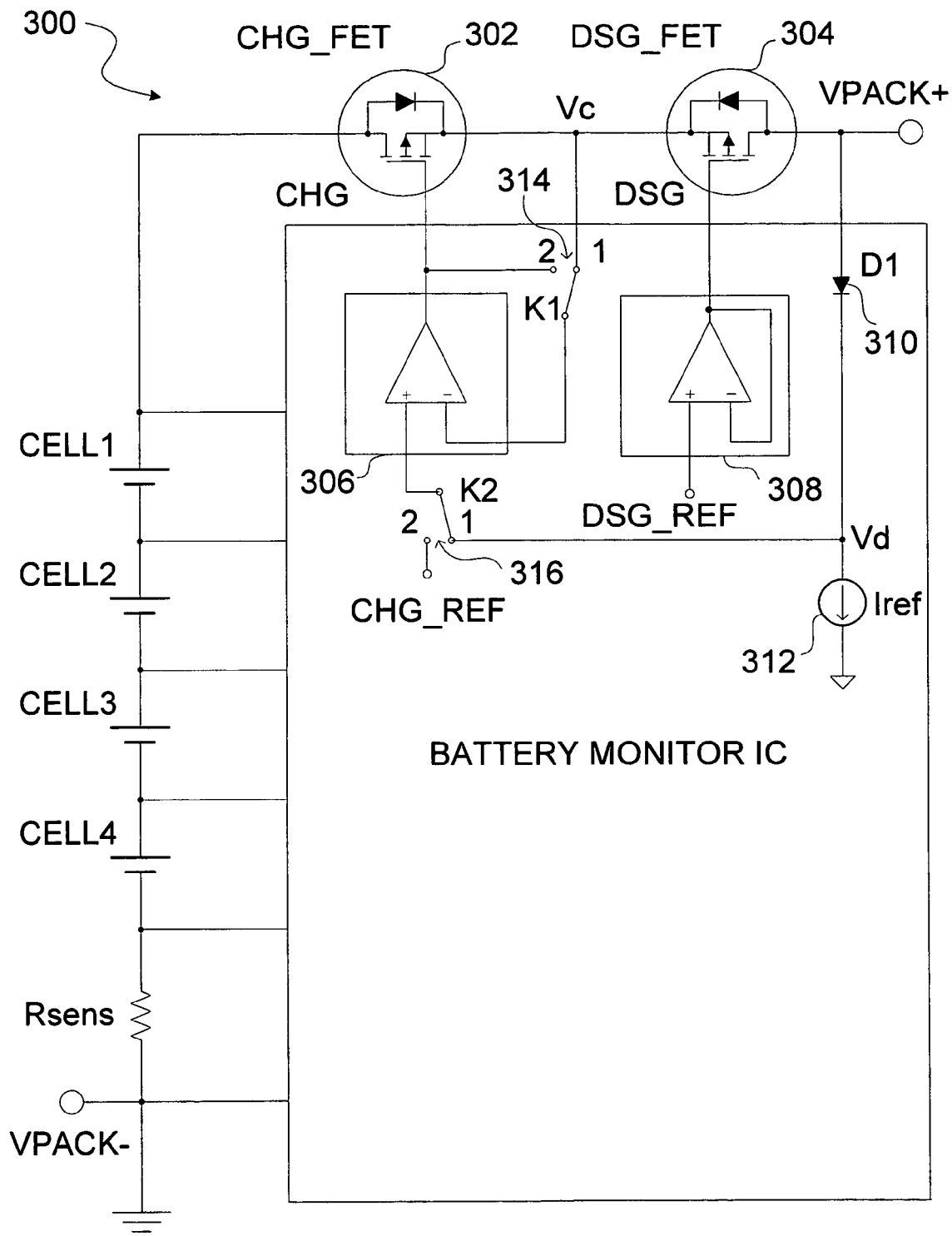
FIG. 3A is another exemplary trickle charge topology according to the present invention.

FIG. 3A depicts another exemplary trickle charge topology 300 according to the present invention. In this embodiment, charge FET and discharge FET may be placed face-to-face in series instead of back-to-back (as shown in FIG. 2A). The embodiment of FIG. 3B may also includes a reference diode D1 310, and in this embodiment the charge FET driver 306 may be controlled by switches K1 and K2.

In normal charge mode, switches K1 and K2 may be set to position 2, so the charge FET gate voltage is driven to CHG_REF, which may operate to fully turn on the charge FET 302. In trickle charge mode, discharge FET 304 may be off, and K1 and K2 may be set to position 1. In this case the charge FET driver 306 may operate to regulate the charge FET 302 to force voltage Vc substantially equal to Vd. In forward bias condition, the diode D1 DC current is:

$$Iref=A1*IS1*(\exp(Vd1/Vt)-1)$$

where A1 is diode D1 junction area, IS1 is diode D1 unit reverse saturation current, Vd1=VPAK+−Vd is the voltage drop across the diode D1, and Vt is diode threshold voltage.

The DC current in the body diode of discharge FET will be:

$$Ipch=A2*IS2*(\exp(Vd2/Vt)-1)$$

where A2 is the body diode junction area, IS2 is the body diode unit reverse saturation current, Vd2=VPACK+−Vc is the voltage drop across discharge FET body diode.

IS1 and IS2 are are determined by the type of semiconductor device chosen, as is well understood in the art.

If Vd and Vc are forced equal, then the trickle charge current is $$Ipch=A2/A1*(IS2/IS1)*Iref.$$

FIG. 3B depicts one exemplary trickle discharge topology 400 according to the present invention. This embodiment is similar to the topology 300 depicted in FIG. 3A, except the reference current source 312 and the diode 310 are coupled on the discharge MOSFET 302 side. During a trickle discharge period the charge MOSFET 304 may be OFF, and discharge current may flow through the body diode. The operation of the topology 400 is otherwise described above with reference to FIG. 3A.

In order to speed up the trickle charge process, the trickle charge current Ipch can be readily adjusted based on the cell voltage. The higher the cell voltage, the larger the trickle charge current is set by programming the reference current Iref. The programmable reference current source in FIG. 5 may be adapted to generate a reference current based on the cell voltage, as would be well understood in the art.

Figure 4:
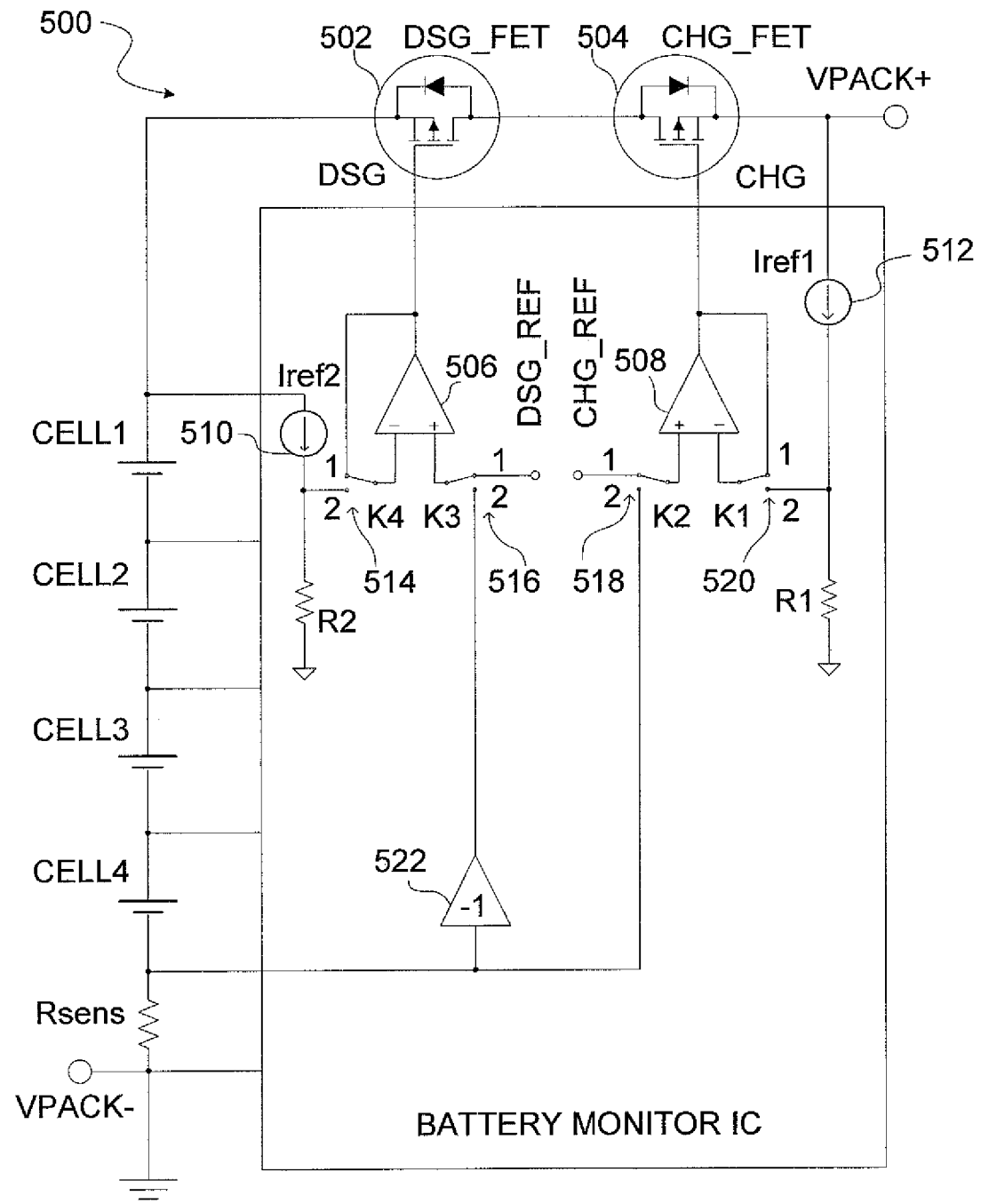
FIG. 4 is another exemplary trickle charge and trickle discharge topology according to the present invention.

Still another exemplary trickle charge and trickle discharge topology 500 is depicted in FIG. 4. In this exemplary embodiment, the charge FET 504 and discharge FET 502 may be placed back-to-back in series in the manner depicted and as understood in the art. In a trickle charge mode, the discharge FET 502 may be off (non-conducting), but the current can still pass through its body diode to the battery cells if charge FET(CHG_FET) is on (conducting). If CHG_FET is off, then no current flows from or into the battery cells.

This embodiment may also include a reference resistor R1 and R2, discharge driver 506, charger driver 508, and reference current source Iref1 512 and Iref2 510. The charge driver 508 and discharge driver 506 may include respective amplifiers. In a regular charge mode, switches K1 and K2 (518 and 520) may be set to position 1. In this position, the charge driving voltage CHG may be driven to a point approximately equal to a relative reference voltage CHG-REF, which may operate to fully turn on the charge FET 504. Therefore, the reference voltage CHG-REF may be selected in accordance with the turn on requirements of the charge FET device 504.

When trickle charge is needed, switches K1 and K2 may be connected to node 2. The input to the amplifier 508 in this case may be the voltage across Rsens (+) and the voltage drop across R1 (as generated by Iref1 512). The gain of the amplifier 508 may be selected to be large (e.g., $\geq 80$ dB) so that the voltage drop from Iref1 across the resistor R1 will be approximately equal to the voltage drop from trickle charge current Ipch across the sense resistor Rsens.

The trickle charge current is given by:

$$Ipch=Iref1*R1/Rsens;$$

where Iref1 is a programmable current reference source. Usually Rsens is very small (for example on the order of 10 to 20 mOhms), while R1 may be selected to be on the order of 10 Ohms. Therefore, the ratio R1 over Rsens can be very large, and thus a small reference current Iref1 can be used to generate a relatively large trickle charge current because of large gain of R1/Rsens.

In the embodiment of FIG. 4, during trickle charge mode, the discharge FET also can be fully turned on, thereby eliminating the diode forward biasing voltage drop between VPACK+ and battery pack voltage. This is the advantage of FIG. 4 over the embodiments shown in FIG. 2A and FIG. 3A. In this mode, switches K4 514 and K3 516 may be set to position 1 thereby driving the discharge FET with the discharge reference voltage to fully turn on the discharge FET (in a manner described above).

Still with reference to FIG. 4, in a normal discharge mode, switches K3 and K4 may be connected to node 1, respectively. In this manner, the discharge FET driver may be configured as a buffer and drive the discharge FET to fully turn on. When in trickle discharge mode, switches K3 and K4 may connect to node 2. The voltage drop from Iref2 across the resistor R2 may be approximately equal to the voltage drop across the sense resistor, Rsens, because of the high gain of the driver. So, the trickle discharge current is:

$$Idsg=Iref2*R2/Rsens$$

where Iref2 is a programmable current reference source. Usually Rsens may be very small, so the ratio R2 over Rsens can be very large, and thus a small reference current Iref2 can be used to generate relative large trickle discharge current because of large gain R2/Rsens. Because the current direction is reversed during discharge, the voltage drop across sense resistor Rsens have reversed polarity. Accordingly, a polarity reversing circuit 522 may be provided to reverse the polarity of the current across Rsens.

In this embodiment, during trickle charge, the discharge FET can be fully turned on. So the diode forward biasing voltage drop is eliminated between VPACK+ and battery pack voltage. Likewise, during trickle discharge, the charge FET may be fully turned on to eliminate the diode forward biasing voltage drop between the battery pack voltage and VPACK+.

Figure 5:
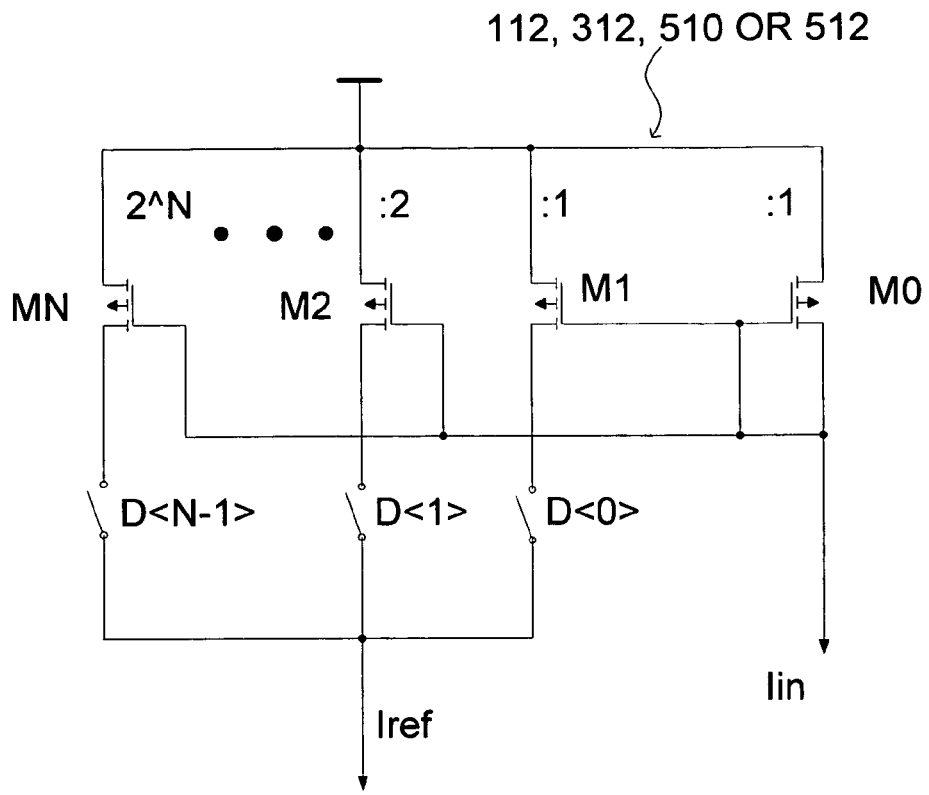
FIG. 5 is an exemplary programmable current source.

In the present invention, once the MOSFETs and the diode are fixed, Ipch can still be adjusted by the programmable current source (Iref) 112, 312, 510 and/or 512. One exemplary circuit topology for a programmable current source is depicted in FIG. 5. The circuit of FIG. 5 may be adapted to generate the current Iref with ratioed current mirrors, as is well understood in the art. Or course, programmable reference current sources are well known in the art and can be implemented in a variety of ways, in addition to the circuit of FIG. 5.

Figure 6:
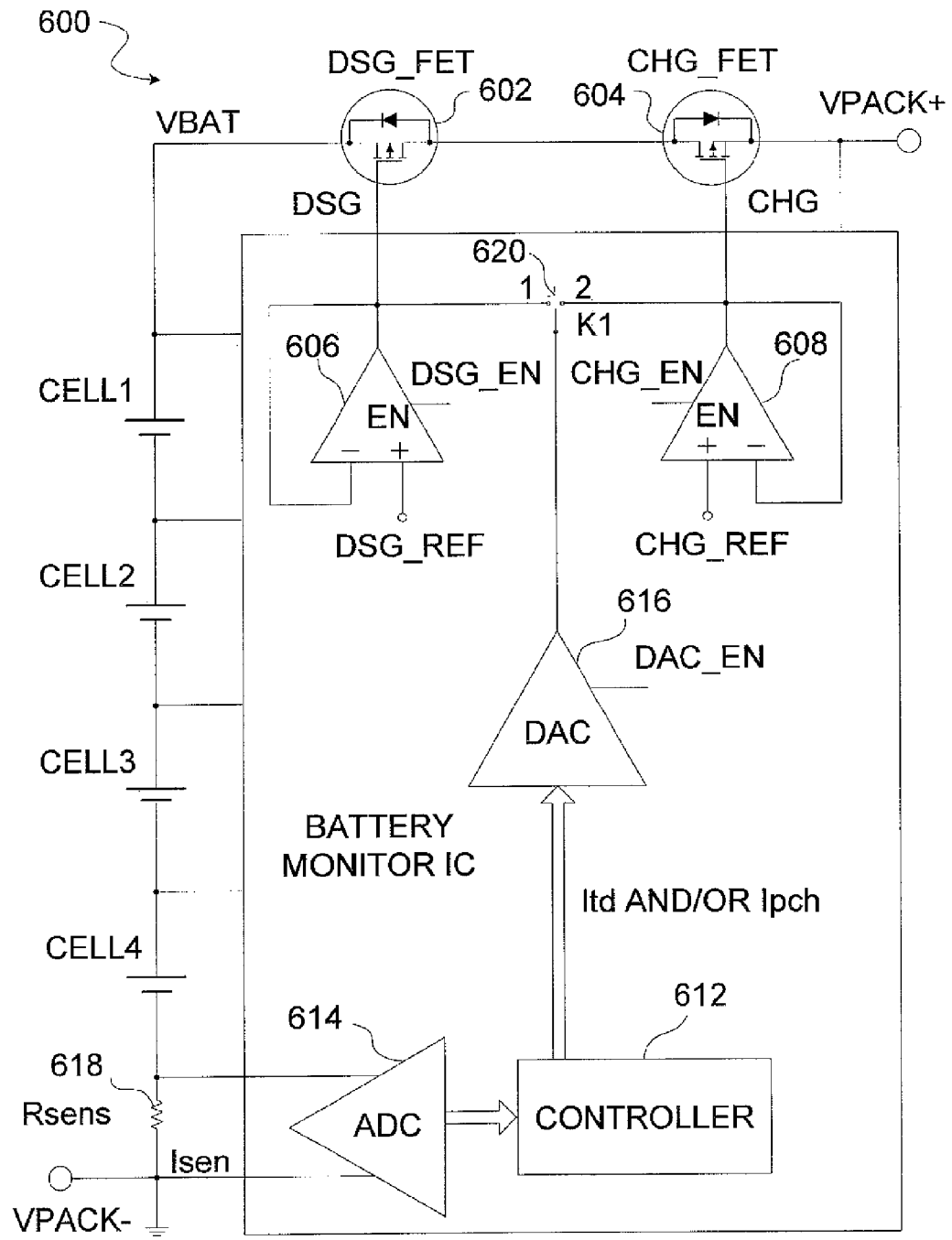
FIG. 6 is another exemplary trickle charge and trickle discharge topology.

One exemplary trickle precharge and trickle discharge topology 600 is depicted in FIG. 6. In this embodiment, the charge FET 604 and discharge FET 602 may be placed back-to-back in series in the manner depicted and as understood in the art, or alternatively, face-to-face in series as described above. In this exemplary embodiment, a digital to analog converter circuit (DAC) 616 may be used to generate the FET driving voltages, as described more fully below.

This embodiment includes a control loop that may comprise an analog to digital converter circuit (ADC) 614, a controller 612 and a digital to analog converter circuit (DAC) 616. Current sensed across the sense resistor Rsens 618 may be received by the ADC 614. The ADC, in turn, may generate digital signals indicative of the sensed current and transmit those signals to the controller 612. In operation, if the current through the resistor Rsens 618 is smaller than a predefined threshold, the controller 612 may send data to the DAC 616 to increase the corresponding FET driving voltage. Otherwise, the controller 612 may send data to the DAC 616 to decrease the FET driving voltage until the difference between the sensed current and predefined current is approximately equal. These operational characteristics of this embodiment are described more fully below.

In normal charge or discharge mode, the DAC 616 may be disabled, and the charge FET 604 and discharge FET 602 are conducting. In this embodiment, DAC 616 may be capable of being controllably enabled and/or disabled, for example, by utilizing a DAC_EN signal as depicted. The charge FET driver 608 may drive the gate of charge FET 604 to a CHG_REF value, which may fully turn on the charge FET 604. The discharge FET driver 606 may drive the gate of discharge FET 602 to a DSG_REF value, which may fully turn on the discharge FET 602. Charge FET driver 608 and discharge FET driver 606 may be controllably enabled and/or disabled, for example, utilizing a CHG_EN and DSG_EN signal, respectively.

In a trickle discharge mode, switch K1 (620) may be connected to node 1. The discharge driver 606 may be disabled (e.g., DSG_EN is low) which may operate to produce a high impedance on the output of the discharge driver 606. The conduction state of the discharge FET 602 may be controlled by the DAC 616 and controller 612. Thus, the discharge FET 602, sense resistor Rsens 618, the ADC 614, the controller 612 and the DAC 616 may comprise the control loop. By controlling the turn on resistance of the discharge FET 602, the present embodiment may be capable of adjusting a trickle discharge current to a desired value, as may be preprogrammed into the controller. As described above in the previous embodiments, the turn on resistance of the discharge FET 602 can be adjusted by adjusting its gate driving voltage.

Controller 612 may comprise circuitry to control the operation of DAC 616. As used in any embodiment herein, "circuitry" may comprise, for example, singly or in any combination, hardwired circuitry, programmable circuitry, state machine circuitry, and/or firmware that stores instructions executed by programmable circuitry. Controller 612 may comprise one or more integrated circuits. As used in any embodiment herein, an "integrated circuit" means a semiconductor device and/or microelectronic device, such as, for example, a semiconductor integrated circuit chip. Although not shown in FIG. 6, this embodiment may also comprise memory which may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively, memory may comprise other and/or later-developed types of computer-readable memory. Machine-readable firmware program instructions may be stored in memory. As described below, these instructions may be accessed and executed by controller 612, and these instructions may result in controller 612 performing the operations described herein as being performed by controller 612 and/or other circuitry which may be comprised in this embodiment.

In this embodiment, controller 612 may be capable of generating one or more data bits representing a desired trickle discharge current value Itd. To that end, controller 612 may be capable of performing successive and/or recursive operations to achieve a desired trickle discharge current based on actual current as may be sensed across Rsens 618. For example, if the desired trickle discharge current is set to Itd, controller 612 may be capable of performing a successive approximation register (SAR) method to generate the appropriate data bits. The SAR method may comprise initially setting the DAC MSB (most significant bit) to high, and then measuring the current across Rsense 618. If the current through the sense resistor 618 (Isen) is larger than Itd, then controller 612 may set the DAC MSB to low, otherwise controller 612 may keep the DAC MSB high. Controller 612 may then set the second MSB bit high and then measure the current through Rsens. If Itd<Isen, the second MSB may be set low, otherwise this bit may be high. This successive approximation may continue until DAC LSB is set. Accordingly, executable instructions may be stored in memory (not shown), and controller 612 may access those instructions to perform operations, for example the SAR method. If Itd is fixed for a given battery pack, then the instructions stored in memory may also be fixed. Whenever trickle discharge is needed, the controller 612 may be capable of controlling the DAC 616 to generate a desired trickle discharge, and thus, the battery pack may be capable of delivering Itd to an external load. The control code that generates the appropriate trickle discharge current may be saved in memory, and may be assessed by controller 612 for subsequent trickle discharge operations. If the trickle discharge current needs to be adjusted, the control loop described herein may be used to increase or decrease the Itd accordingly. During trickle discharge mode, the charge driver 608 can be enabled or disabled. The difference is that the trickle discharge current will flow through the charge FET or through its body diode respectively.

In a trickle charge mode, switch K1 is connected to node 2. The charge driver 608 may be disabled (CHG_EN is low). The conduction state of the charge FET 604 may be controlled by the DAC 616 and controller 612. In this mode, the charge FET 604, sense resistor Rsens 618, the ADC 614, the controller 612 and the DAC 616 may comprise the control loop. By controlling the turn on resistance of the charge FET 604, the present embodiment may be capable of adjusting the trickle charge current to a desired value. Precharge current is often a fixed value. In this mode, the present embodiment may generate Ipch, using for example the above-mentioned SAR method, and save this control code in the memory. For trickle precharge current, the value may vary in a range from high limit to low limit, and thus, the control code may be adapted to vary Ipch between a high and low range, thus permitting the trickle charge current to be adjusted accordingly. During trickle charge mode, the discharge driver 606 can also be enabled or disabled. The difference is that the trickle charge current will flow through the discharge FET or through its body diode, respectively.

Figure 1A:
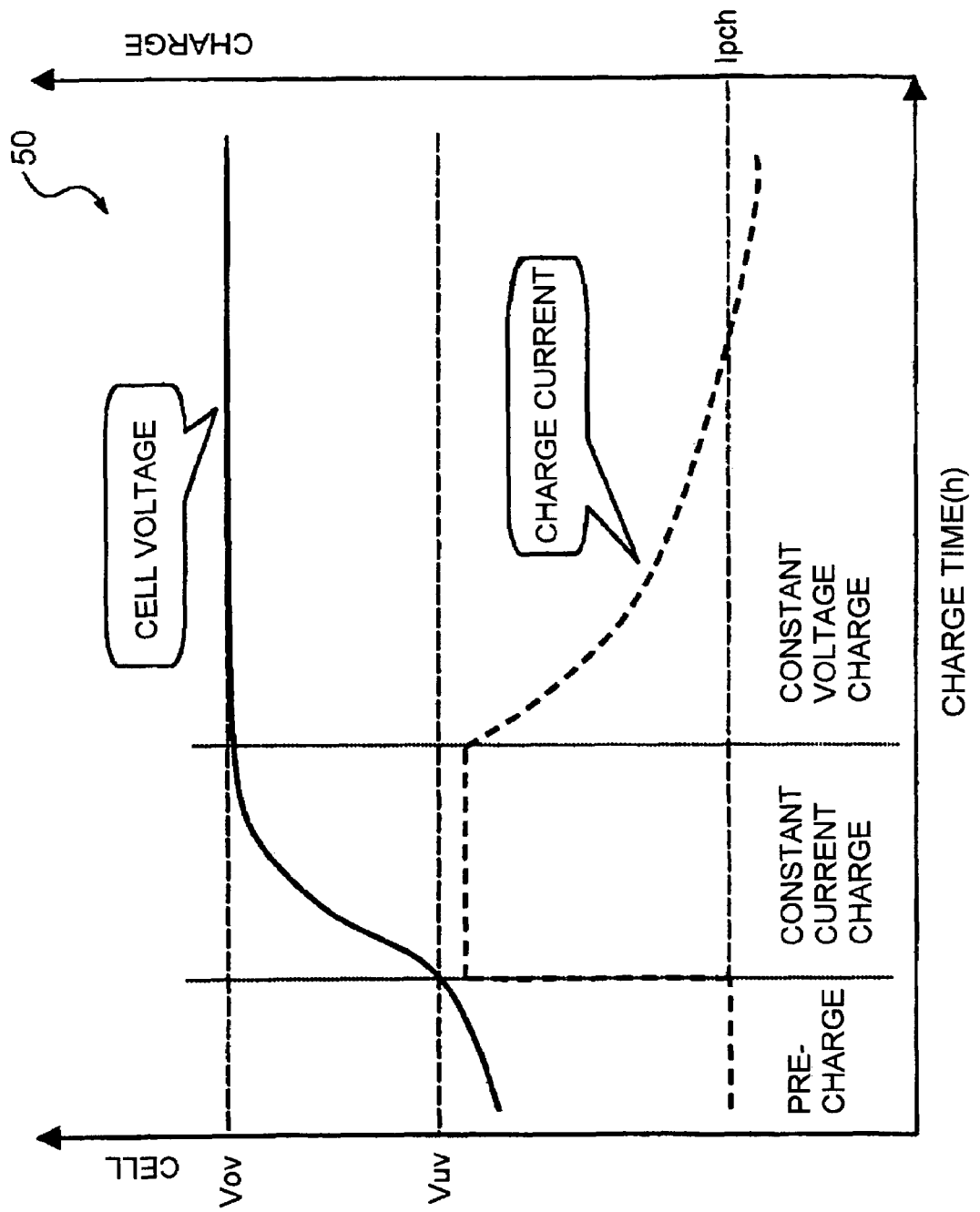
FIG. 1A is graphical representation of a typical charging profile for a LiIon battery.

From FIG. 1A, we know that during the precharge period and constant voltage (CV) charge period, the charge current may need to be controlled. In conventional circuits, an additional precharge FET is needed to control the precharge current. In such a conventional circuit, the CV charge must fully rely on the charger to accurately regulate the charge voltage to Vov, then the charge current will taper.

In the present invention, the precharge function can be implemented without the extra pre-charge FET. Furthermore, in order to speed up the precharge process, the pre-charge current Ipch can be easily adjusted based on the cell voltage. The higher the cell voltage, the larger the pre-charge current may be supplied by programming the reference current Iref, such as described herein with reference to FIG. 2A, FIG. 3A and FIG. 4, or the control loop approach described in FIG. 6.

Advantageously, trickle precharge current control, as described in numerous embodiments herein, can be utilized during a CV time period where trickle precharge circuitry may be capable of generating a trickle charge current based on the cell voltage. In this manner, the CV charge current taper does not need to rely on the charger regulated voltage Vov. Therefore, advantageously, the present disclosure provides several embodiments which may obviate the need for an expensive, accurate voltage regulation charger. Indeed, a simple AC adapter can be used to charge the lithium ion battery. Because in CV charge period, even the charger cannot hold the constant voltage to Vov, but the charge current is limited to the pre-programmed trickle current value, which is determined based on the cell voltage. So, over charging won't happen. This charge current limitation can be used as a secondary over-voltage protection (by setting the current limit slightly above the actual observed current for the desired $V_{OV}$), and/or as the primary over-voltage protection (by regulating the charge current until the exact desired $V_{OV}$, is obtained).

Also advantageously trickle discharge according to the present invention may provide better short-circuit protection for the battery pack. In conventional battery packs, the discharge FET can either fully turn on to allow discharge or fully turn off to disable discharge. When the battery pack is out of the system, for example, put on the shelf, then the discharge FET may be kept ON to prepare for powering the system anytime that the battery pack may plugged into the system. In this case, if something abnormal happens, such as a VPACK+ terminal short, a huge current may be drawn from the battery, which in turn will damage the battery. Alternatively, in conventional battery packs, the discharge FET may be kept OFF to protect the battery from short-circuit condition. But this will prevent the battery to power the system when the battery pack is plugged into the system. To overcome this difficulty, some conventional battery packs may provide a mechanical method to inform the battery back to turn on the discharge FET. This may cause inconvenient to the customer, and may also increase the price and/or size of the battery pack. According to at least one embodiment described herein, the battery pack may be placed in a trickle discharge mode when the battery is out of the system. The trickle discharge current value can be chosen to be large enough, for example 100 mA, to power the system embedded controller when the battery pack is plugged into the system. Then the system embedded controller will detect that the battery is present and inform the battery to operate in a normal discharge mode. With the discharge FET limiting the current to predetermined trickle discharge value, for example 100 mA, even during a VPACK+ short, a high current surge may be prevented.

The trickle discharge and trickle charge topologies described herein may also be utilized in multiple battery systems. When multiple battery packs discharge simultaneously, they can provide more power to the system. This may also decrease the internal impedance of the battery because multiple battery packs may be coupled together in parallel to increase efficiency. However, stringent regulations may require that if multiple battery packs discharge simultaneously, those multiple batteries must have exactly the same voltage. Otherwise, even if two battery packs have very small voltage difference (for example 10 mV) because of the very small resistance of power bus coupled to the battery (for example 2 milliohm) then a large current (5 amperes in this example) may flow from the higher voltage battery pack into the lower voltage battery pack.

In practice, it is difficult to maintain multiple battery packs to have the same voltage, also it very hard to determine if the two battery packs are at the same voltage even with a very accurate ADC to monitor the battery voltage, because the battery pack voltage may vary with the discharge current. Trickle discharge operations, as described herein with reference to numerous embodiments, may be capable of solving multiple battery pack issues. As an example, a system may comprise two battery packs, Pack A and Pack B. Assume that initially Pack A voltage is higher than Pack B.

Pack A may discharge first to power the system, and the voltage of Pack A drops gradually. The discharge FET of Pack B may be OFF to disable discharge of Pack B.

When Pack A voltage drops to the same as Pack B voltage, the present invention can set Pack B either in trickle charge mode or in trickle discharge mode. If Pack B is enabled in trickle charge mode, the discharge FET may be fully turned on, and the charge FET may be controlled to operate in a saturation conduction range. In this manner, the charge FET may be used as a current limit resistor. If Pack B is enabled in trickle discharge mode, the charge FET may be fully turned on, and the discharge FET may be controlled to operate in a saturation conduction range. In this manner, the discharge FET may be used as a current limit resistor. For added safety, and referring to the topology 600 of FIG. 6, the trickle charge operations and/or trickle discharge operations may be set controlled to produce a relatively small current value by operating the charge FET and discharge FET in a saturation conduction range to increase the equivalent resistance of the charge FET and/or the discharge FET.

In the preceding example, because Pack A is discharging and Pack B is idle, the actual Pack A voltage will be higher than pack B voltage even though their measured voltage value may be equal. If this happens, Pack A may charge Pack B. However, the charge current is limited by the resistance of the charge FET (if we put pack B in trickle charge mode) or the discharge FET (if we put pack B in trickle discharge mode). The limited current is determined by, for example, the control code executed by controller 612.

In the present invention, this charging current may be monitored by the ADC comprised in Pack B. As the voltage difference between pack A and pack B get reduces, the charge current from pack A to pack B also reduces. When the charge current is smaller than a predetermined value, for example 10 mA, the controller may switch Pack B from a trickle charge mode or trickle discharge mode to a fully discharge mode.

Accordingly, there has been disclosed programmable trickle precharge and/or trickle discharge circuitry and methodology that provides more flexibility, fewer components, and higher efficiency to finish precharging as compared with a conventional topology. It should be understood that the switches (K1, K2 and/or K3 and K4) may be controlled by the battery monitor IC to put the programmable trickle charge circuits of at least one embodiment described herein into a trickle precharge mode or a normal charge mode based on the level of charge on the battery cells (deeply discharged requires a trickle charge mode). It should be further understood that the topologies depicted herein may be implemented using discrete components and/or integrated into an IC and/or a combination of both.

The present invention may be adapted for any portable electronic device (portable computer, cell phone, PDA, etc.) that uses rechargeable batteries. To that end, the topologies depicted herein may be integrated into a battery pack for a portable electronic device. "Battery pack", as used herein, may be defined as a battery comprising at least one battery cell. A battery pack may comprise one or more rechargeable lithium ion cells. A battery pack may also comprise one or more electronic components, such as depicted and described herein to facilitate controllable charging and/or discharging and/or operation of the battery pack.

Over Voltage Transient Controller Material

Figure 7:
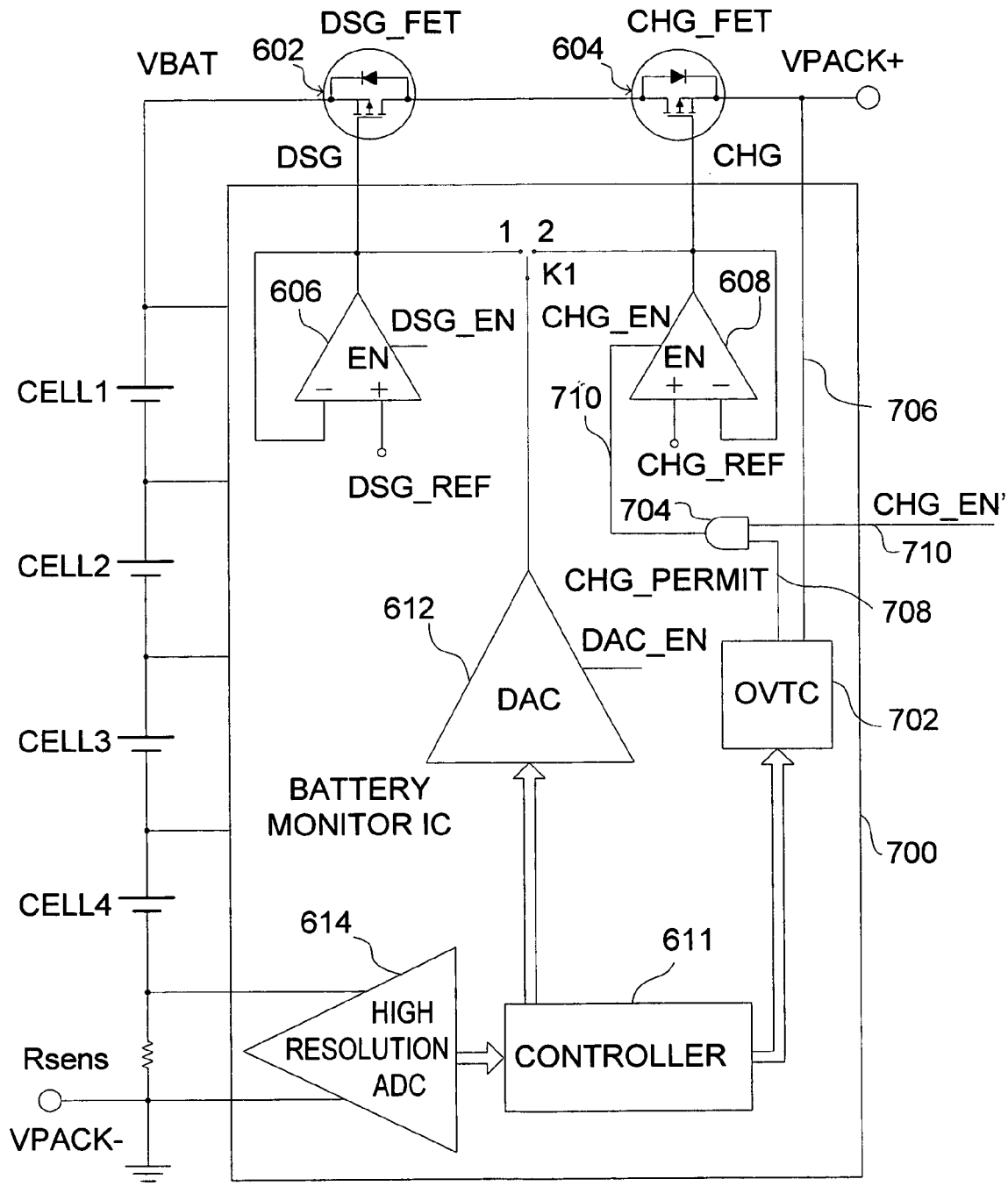
FIG. 7 is the trickle charge and trickle discharge topology of FIG. 6 having an over voltage transient controller.

FIG. 7 illustrates another embodiment of the trickle precharge and trickle discharge topology of FIG. 6 having an over voltage transient controller 702. In general, the over voltage transient controller 702 protects the cells of the battery pack from an over voltage transient condition. As used herein, an "over voltage transient condition" may be an increase in a voltage level above a normal charging voltage level for a transient time interval. In one example, the increase in voltage level may be greater than about 10 millivolts and the transient time interval may be between about 1 microsecond and 1 millisecond.

To protect the cells of the battery pack from an over voltage transient condition, the over voltage transient controller 702 may accept an input signal indicative of the voltage level provided to the battery pack and sense if an over voltage transient condition occurs. If such an over voltage transient condition is sensed, the over voltage transient controller 702 may provide an output control signal representative of this condition. The charging switch 604 may be responsive to the output control signal from the over voltage transient controller 702 to protect the rechargeable battery from the over voltage condition. In one embodiment, the switch 604 may open during the over voltage condition to protect the rechargeable battery.

The integrated circuit 700 of the topology of FIG. 7 may have current limiting circuitry as detailed with respect to FIG. 6. As used herein, "circuitry" may comprise, for example, singly or in any combination, hardwired circuitry, programmable circuitry, state machine circuitry, and/or firmware that stores instructions executed by programmable circuitry. Such current limiting circuitry may include the high resolution ADC 614, the controller 611, the DAC 612, and the switch K1.

The over voltage transient controller 702 may be utilized independently of or together with such current limiting circuitry. For example, the current limiting circuitry may not be controlling the state of the discharge and charge switches 602 and 604 during normal charging and discharging operations and hence the DAC 612 may be disabled. During such charging operations, the charge driver 608 may drive the charge switch 604 to a reference voltage level (CHG_REF) which fully turns on the charge switch 604. Similarly during such discharging operations, the discharge driver 606 may drive the discharge switch 602 to a reference voltage level (DSG_REF) which fully turns on the discharge switch 602. Yet the over voltage transient controller 702 may still be protecting the rechargeable battery from an over voltage transient condition during such times.

For instance, during such normal charge and discharge operations, the over voltage transient controller 702 may monitor the voltage level (VPACK+) input to the cells of the battery pack. Such a voltage signal may be input to the over voltage transient controller 702 via path 706. When the monitored voltage level is below an acceptable threshold level, the over voltage transient controller 702 may provide a signal (CHG_PERMIT signal) at a digital one level to AND gate 704 via path 708. Alternatively, when the monitored voltage level is equal to or above the threshold level, the over voltage transient controller 702 may provide a signal (CHG_PERMIT signal) at a digital zero level to AND gate 704 via path 708.

The AND gate 704 may provide a charge enable signal (CHG_EN) via path 710 that enables or disables the charge driver 608. The AND gate 704 may provide a digital one charge enable signal when both inputs to the AND gate 704 are a digital one. One input to the AND gate 704 may be from the over voltage transient controller 702 via path 708. The other input to the AND gate 704 may be a secondary charge enable signal (CHG_EN') input via path 710. The secondary charge enable signal (CHG_EN') received via path 710 may be provided via any variety of circuitry that, in one instance, may monitor the charge on each of the cells of the battery pack. The CHG_EN' signal may be a digital one if the voltage level of all of the cells is above a threshold level. Alternatively, the CHG_EN' signal may be a digital zero if the voltage level of one cell is below the threshold level.

Figure 1B:
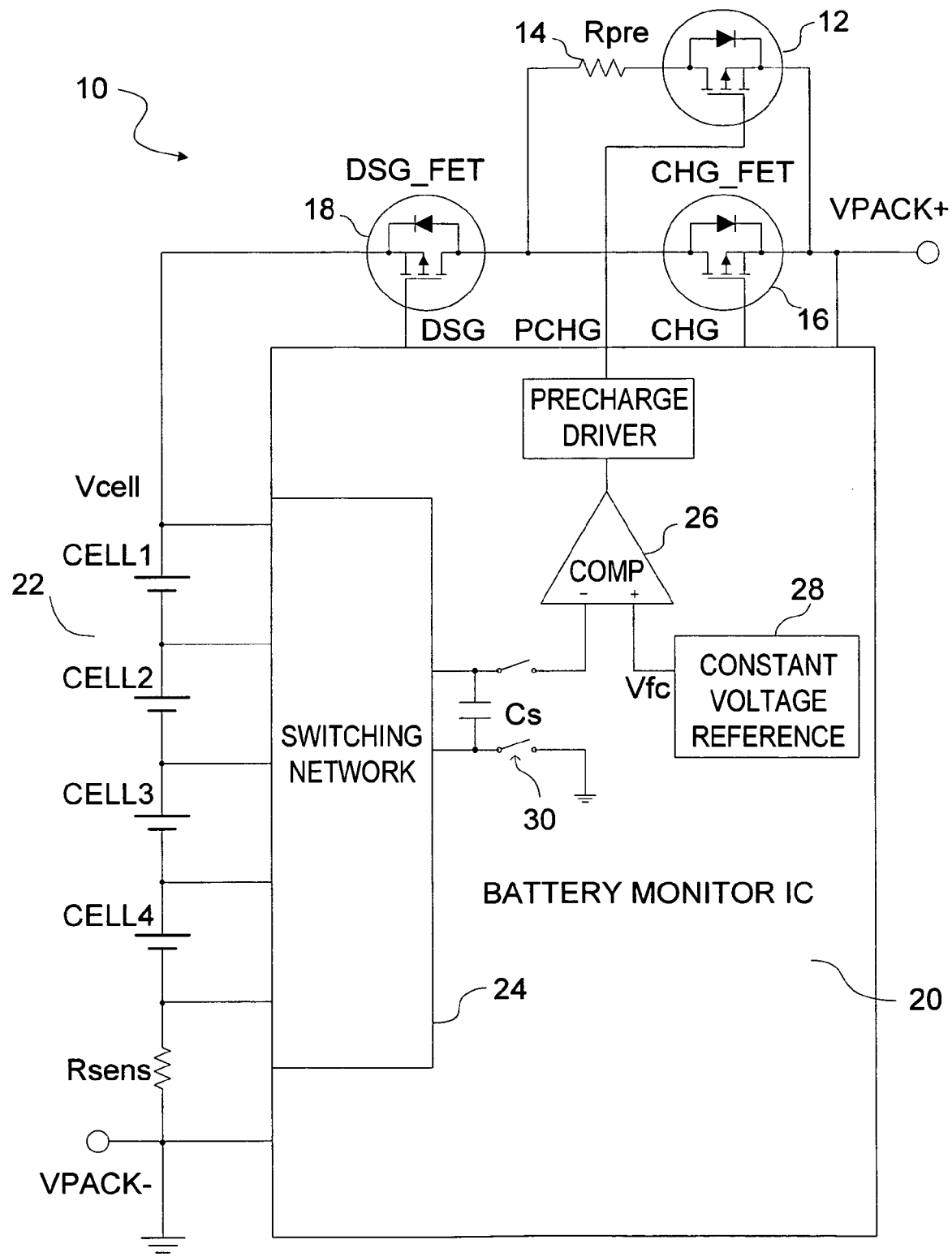
FIG. 1B is a conventional battery precharge circuit.

Hence, during a normal battery charging operation the over voltage transient controller 702 may sense an over voltage transient condition and provide a digital zero output signal to AND gate 704. Accordingly, the output of the AND gate 704 will go to a digital zero irregardless of the CHG_EN' signal and the charge driver 608 may open the charge switch 604 to protect the battery from the over voltage transient condition. In one instance, such an over voltage transient condition may occur during the constant voltage charge state (see FIG. 1B).

Therefore, the time from the start of the over voltage transient condition to the actual opening of the charge switch 604 should be fast enough to prevent a significant over voltage transient from reaching the cells. In one embodiment, a few microseconds may be acceptable. Therefore, the over voltage transient controller 702 should be able to quickly detect the over voltage transient condition and provide a digital zero signal to the AND gate 704, and the charge driver 608 should be able to respond quickly to open the charge switch 604. Although digital switch control has been heretofore described to control the charge switch 604 by opening the charge switch in case of an over voltage condition, an analog switch control scheme may also be implemented. The analog switch control scheme may provide an analog signal to the driver 608 to control the ON resistance of the charge switch 604. Therefore, the over voltage transient condition can drive the charge switch 604 to an intermediate conduction state to limit a voltage provided to the battery during an over voltage transient condition.

The over voltage transient controller 702 may also sense when a transient voltage condition has dissipated and provide a digital one, output signal to the AND gate 704. As long as the secondary charge enable signal CHG_EN' is also a digital one, normal charging operations may resume. It is normally not necessary for the charging switch 604 to close as quickly as it opens because over voltage transient conditions that cause opening of the charging switch 604 should occur relatively infrequently so that even a relatively slow charge switch 604 closing time should not significantly reduce the average charge current.

Although the over voltage transient controller 702 may be used independently of the current limiting circuitry, the over voltage transient controller 702 may also be used together with the current limiting circuitry to provide some additional features. For instance, if the voltage value provided to the battery cells during charging is slightly increased above an expected voltage level, the current limiting control loop of the current limiting circuitry may be coupled to the discharge driver 606, via switch K1 in position 1, to control the ON resistance of the discharge switch 602 to the point where the average output voltage to the rechargeable battery is lowered to the desired voltage level. At the same time, the over voltage transient controller 702 may monitor the voltage level provided to the battery to protect against an over voltage transient condition.

Such simultaneous operation of the current limiting circuitry to control the ON resistance of the discharge switch 602 and the over voltage transient controller 702 to control the state of the charge switch 604 may be advantageous during a variety of situations. One of these situations may be when an associated charger is producing a desired output voltage level, but an unbalanced or mismatched internal cell of the battery pack may see an excessive charge voltage. Reducing the average charging voltage value by controlling the ON resistance of the discharge switch 602 may allow the unbalanced or mismatched cell to see a more moderate charge voltage. Hence, charging can continue as additional cell balancing takes place where otherwise charging may be stopped because of the cell seeing an excessive charge voltage.

In contrast, another situation may be when an associated charger is producing a desired output voltage level, but the voltage seen by the cells of the battery pack may not be high enough to obtain the maximum safe charging rate. This may occur due to a number of factors, e.g., line losses. The charger output voltage may then be deliberately increased by a small amount. The current limiting circuitry may then be utilized to control the ON resistance of the discharge switch 602. The higher voltage level from the charger may be reduced by increasing the ON resistance of the discharge switch 602 to provide the battery cells with a maximum safe charging voltage. Accordingly, charging time may be reduced.

Yet another situation may be to provide for simultaneous charging or two or more battery packs in parallel. This is because the battery pack can handle a small over voltage condition by having the discharge control loop of the current limiting circuitry control the ON resistance of the discharge switch 602, thus relaxing the need to have nearly identical voltage levels for each battery pack when coupling the battery packs together via a low resistance path.

In each of these three situations, the ON resistance of the switch 602 may be controlled to select the desired voltage or current base on the assumed or measured average VPACK+ voltage. The over voltage transient controller 702 may then enhance or enable these strategies by controlling the charging switch 604 to suppress any over voltage transients that may occur.

Figure 8:
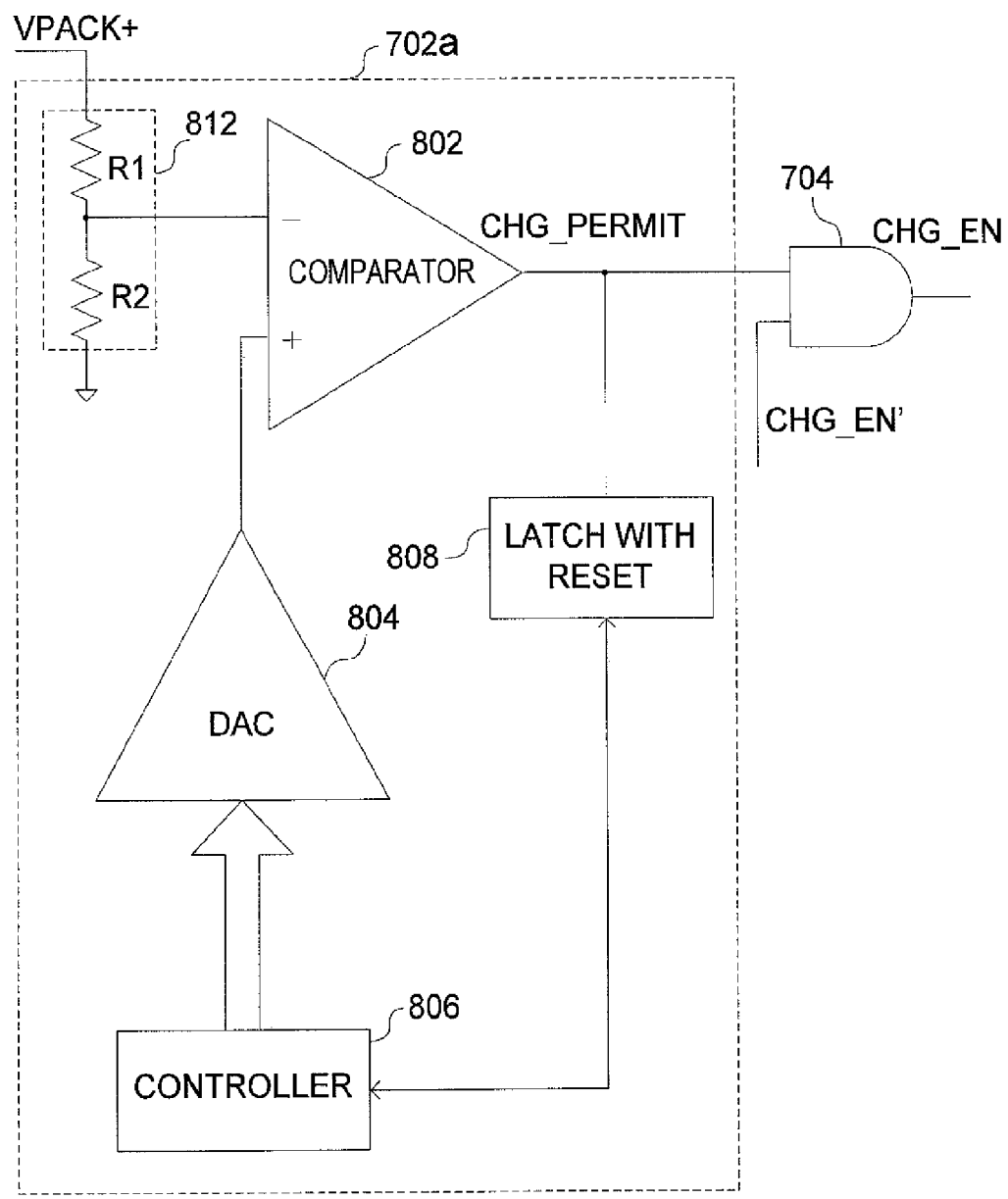
FIG. 8 is one embodiment of the over voltage transient controller of FIG. 7.

FIG. 8 illustrates one embodiment of an over voltage transient controller 702a consistent with the over voltage transient controller 702 of FIG. 7. The over voltage transient controller 702a may include a comparator 802, a digital latch 808, a controller 806, a DAC 804, and a voltage divider 812. The voltage divider 812 may include resistors R1 and R2 to scale down the voltage level seen at VPACK+ to a proportionately lower voltage level. The voltage divider 812 may then provide the scaled down voltage level to the inverting input terminal of the comparator 802. The comparator 802 may compare the scaled down VPACK+ voltage level to a reference voltage level provided by the DAC 804 and provide and output signal CHG_PERMIT having a state depending on the comparison. The signal may be a digital one when the scaled down voltage is less than the reference voltage level and may be a digital zero when the scaled down voltage is greater than or equal to the reference voltage thereby indicating an over voltage transient condition.

The comparator 802 may be able to make the necessary comparison in microseconds thus quickly providing a digital zero output signal to protect the cells of the battery pack from an over voltage transient condition. The digital latch 808 latches a digital zero CHG_PERMIT signal state for output to, and reset by, the controller 806. Therefore, if an over voltage transient condition occurred for a short time interval, the controller 806 would still be able to detect that it happened. The DAC 804 as commanded by the controller 806 may provide the reference voltage to the non-inverting terminal of the comparator 802.

In one embodiment, the DAC 804 may be a high resolution DAC, may have low linearity, may be un-calibrated, and may be relatively slow. As used herein, a "high resolution DAC" means a DAC having at least 10 bits of resolution. The DAC 804 output may be increased until it just exceeds the scaled down voltage input to the inverting input terminal of the comparator 802 causing the CHG_PERMIT signal to be a digital zero and causing such signal to be latched by the digital latch 808. For an 11 bit high resolution DAC, this process may require up to 2,048 tests starting from zero and incrementing by one. This test process may be accelerated by any variety of methods including stepping across only the small range of know relevant voltages or by the SAR technique earlier described.

If the average value of VPACK is known (perhaps by the use of an accurate external analog to digital converter (ADC)), a table of digital DAC input values corresponding to known average VPACK voltages may be constructed. From this table, the approximate digital input needed for the desired output reference voltage may be extrapolated. Alternatively, if a highly linear and well calibrated DAC is used for DAC 804, the desired reference voltage provided by the DAC can be selected directly without recourse to closed loop approaches. The DAC required for this approach might be more expensive than the low-linearity DAC required for a closed loop approach.

Figure 9:
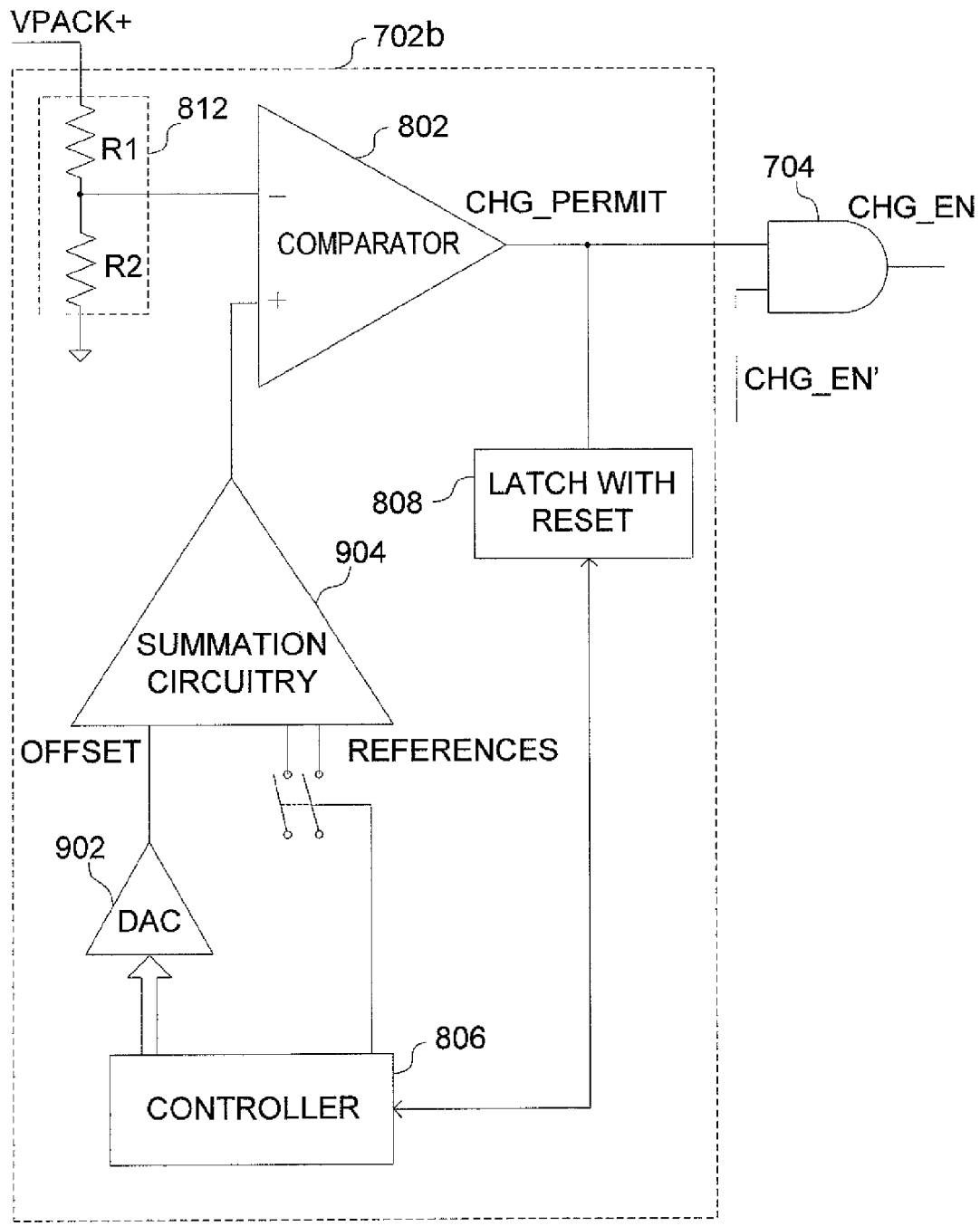
FIG. 9 is another embodiment of the over voltage transient controller of FIG. 7.

FIG. 9 illustrates another embodiment of an over voltage transient controller 702b consistent with the over voltage transient controller 702 of FIG. 7. Components of the over voltage transient controller 702b of FIG. 9 that are similar to the components of the over voltage transient controller 702a of FIG. 8 are labeled similarly and hence any repetitive description is omitted herein for clarity. As opposed to the earlier embodiment of FIG. 8, the embodiment of FIG. 9 may utilize a low resolution DAC 902. As used herein, a "low resolution DAC" means a DAC having no more than 8 bits of resolution. The low resolution DAC 902 may be used to generate a small offset voltage signal.

The summation circuitry 904 may accept the small offset voltage signal from the low resolution DAC 902 and one of a plurality of reference signals from the controller 806 and provide a signal to the non-inverting input of the comparator 802 equal to a sum of the offset voltage signal from the low resolution DAC 902 and the reference signal. Accordingly, the low resolution DAC may trim the selected reference voltage.

The reference signal provided by the controller 806 may be one of a variety of reference signals representative of a variety of voltage levels. The value of the reference signal may vary depending on a variety of factors including, but not limited to, the number of cells in the battery pack and the nominal maximum per cell voltage level. For instance, the controller 806 may provide a signal representative of reference voltage level of 12.6 volts for a three cell battery pack with a nominal maximum per cell voltage level of 4.2 volts. In contrast, the controller 806 may provide a signal representative of a reference voltage level of 16.8 volts for a four cell battery pack with the same nominal maximum per cell voltage level of 4.2 volts.

The lower resolution DAC 902 required in the embodiment of FIG. 9 may be less expensive than a higher resolution DAC of FIG. 8. The DAC 902 may still be controlled in a closed loop manner if desired. However, the DAC 902 may also be controlled in an open loop manner. A relatively precise reference voltage level and a relatively low offset adder from the DAC 902 may be utilized in the open loop operation.

Figure 10:
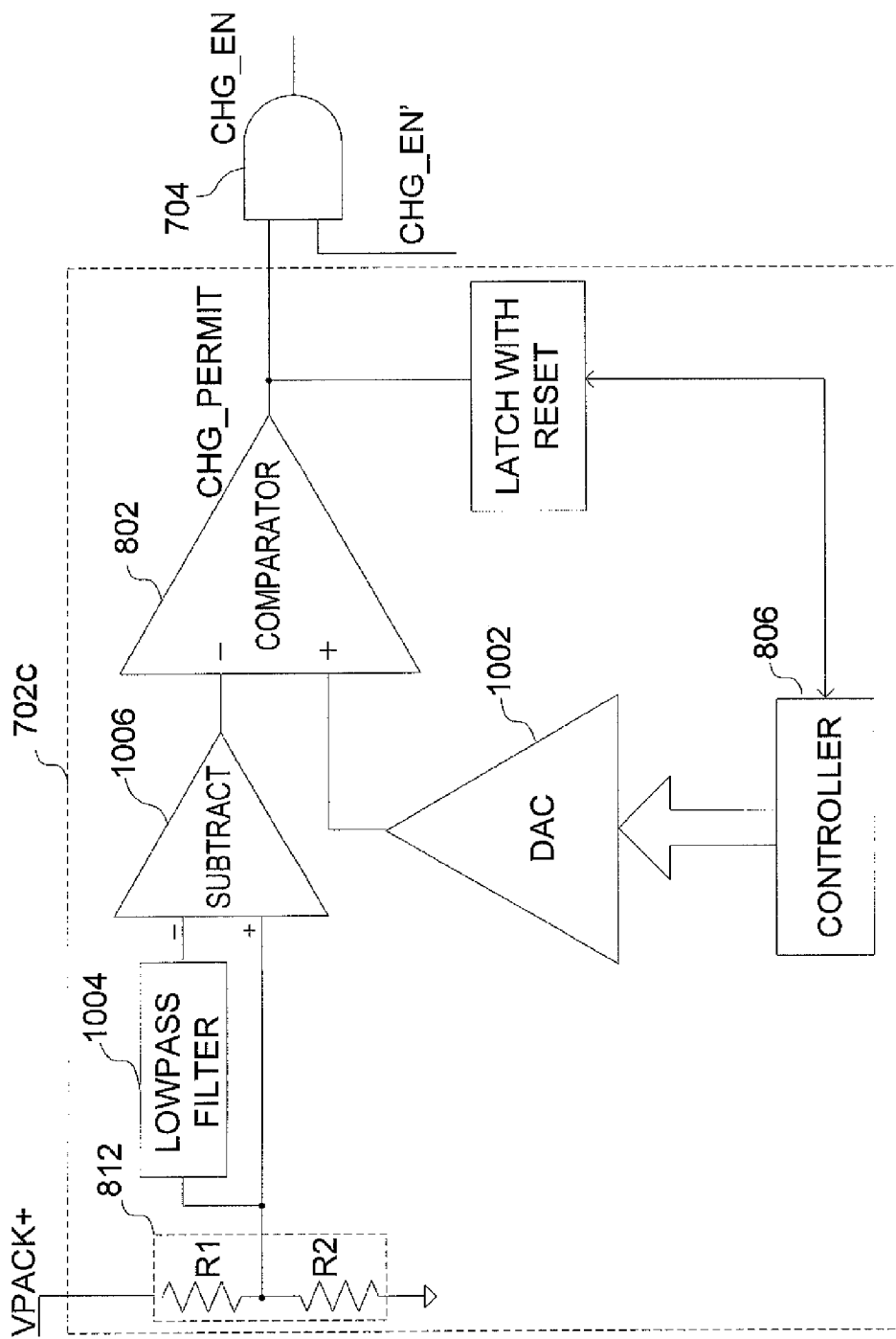
FIG. 10 is yet another embodiment of the over voltage transient controller of FIG. 7.

FIG. 10 illustrates yet another embodiment of an over voltage transient controller 702c consistent with the over voltage transient controller 702 of FIG. 7. Components of the over voltage transient controller 702c of FIG. 10 that are similar to the components of the over voltage transient controller 702a of FIG. 8 are labeled similarly and hence any repetitive description is omitted herein for clarity.

The over voltage transient controller 702c may include a low pass filter 1004, subtraction circuitry 1006, a controller 806, and a DAC 1002. In a constant voltage charge mode, the average VPACK+ voltage may be accurately known from a precision ADC elsewhere in the battery system. Furthermore, the average VPACK+ voltage changes slowly. Hence, the low pass filter 1004 may derive a filtered average VPACK+ voltage level from the scaled down version of VPACK+ from the voltage divider 812. The subtraction circuitry 1006 may then subtract the raw scaled down VPACK+ voltage from the filtered average scaled down VPACK+ voltage to yield a test voltage for the inverting input terminal of the comparator 802. The test voltage is generally sensitive towards an upward movement in the voltage level as opposed to the magnitude of the voltage level.

The comparator 802 may then compare this test voltage to the reference voltage provided by the DAC 1002 and provide a digital one value if the test voltage is less than the reference voltage and provide a digital zero if the test voltage is equal to or greater than the reference voltage. In this embodiment, the DAC 1002 may be a low resolution, low-linearity, un-calibrated, and relatively slow DAC.

It may be necessary to periodically recalculate the reference voltage provided by the DAC 1002 to account for any slow changes to the VPACK+ voltage regardless of open or closed loop control. The low pass filter 1004 may need an external capacitor for stable operation depending on the filter period required. The DAC 1002 may be controlled in an open loop manner by setting the desired DAC voltage level equal to the desired over voltage threshold level less then average VPACK+ voltage (e.g., from a precision ADC elsewhere in the system).

In summary, there is thus provided an over voltage transient controller. The over voltage transient controller may comprise a comparator to compare a first signal with a second signal representative of a reference voltage level and to provide an output signal representative of an over voltage transient condition to a switch if the first signal is greater than or equal to the second signal. The switch is responsive to the output signal to protect a rechargeable battery from the over voltage transient condition. The over voltage transient controller may further comprise a DAC, wherein the second signal is based, at least in part, on an output of the DAC. An apparatus comprising a charge switch and such an over voltage transient controller is also provided.

Finally, there is also provided a method comprising sensing an over voltage transient condition and providing a control signal to a switch coupled between a battery and a power source, to protect the battery from the over voltage transient condition. The protection from the over voltage condition may including driving the switch to an open state thereby isolating the battery from the over voltage transient condition.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. An apparatus comprising:
    a charge switch;
    a discharge switch coupled in series with said charge switch;
    an over voltage transient controller comprising:
        a comparator to compare a first signal with a second signal representative of a reference voltage level and to provide an output signal representative of an over voltage transient condition to said charge switch if said first signal is greater than or equal to said second signal, said charge switch responsive to said output signal to protect a rechargeable battery from said over voltage transient condition; and
    current limiting circuitry configured to control an internal resistance of said discharge switch or said charge switch, to adjust a sensed current to at least approach a predefined value, wherein said current limiting circuitry comprises:
        an analog to digital converter (ADC) configured to receive a signal representative of said sensed current; and
        a second DAC configured to control a voltage supplied to said discharge switch or said charge switch based on said sensed current.

2. The apparatus of claim 1, wherein said over voltage transient controller protects said rechargeable battery from said over voltage transient condition by driving said charge switch to an open state.

3. The apparatus of claim 1, wherein said over voltage transient controller protects said rechargeable battery from said over voltage transient condition by increasing an internal resistance of said charge switch to limit a voltage level provided to said rechargeable battery.

4. The apparatus of claim 1, wherein said over voltage transient controller is capable of controlling said charge switch for protection against said over voltage transient condition while said current limiting circuitry is controlling said internal resistance of said discharge switch.

5. The apparatus of claim 1, wherein said first signal is representative of a difference between a signal representative of an average voltage level of said rechargeable battery and a signal representative of a raw voltage level of said rechargeable battery.

6. The apparatus of claim 5, wherein said over voltage transient controller further comprises:
    a low pass filter capable of providing said signal representative of said average voltage level of said rechargeable battery; and
    subtraction circuitry capable of providing said first signal based on a difference between said signal representative of said average voltage level of said rechargeable battery from said low pass filter and said signal representative of said raw voltage level of said rechargeable battery.

7. The apparatus of claim 1, wherein said over voltage transient controller further comprises a first digital to analog converter (DAC), wherein said second signal is based, at least in part, on an output of said first DAC.

8. The apparatus of claim 7, wherein said second signal is representative of a sum of a reference voltage signal and an offset signal provided by said first DAC.

9. The apparatus of claim 8, wherein said over voltage transient controller further comprises:
    summation circuitry capable of receiving said reference voltage signal and said offset voltage signal and providing said second signal representative of said sum of said reference voltage signal and said offset signal, and wherein said first signal is representative of a voltage level of a rechargeable battery.

10. The apparatus of claim 1, wherein said ADC of said current limiting circuitry comprises a high resolution analog to digital converter (ADC) configured to receive said signal representative of said sensed current.

* * * * *